United States Patent [19]
Cowan, II et al.

[11] Patent Number: 5,465,278
[45] Date of Patent: Nov. 7, 1995

[54] SHROUD ELECTROCHEMICAL POTENTIAL MONITOR

[75] Inventors: Robert L. Cowan, II, Livermore; Gerald M. Gordon, Soquel; Donald A. Hale, Cupertino; Richard W. Perry, San Jose, all of Calif.

[73] Assignee: General Electric Company, San Jose, Calif.

[21] Appl. No.: 247,736

[22] Filed: May 23, 1994

[51] Int. Cl.⁶ .................................................. G21C 17/00
[52] U.S. Cl. .......................... 376/245; 376/305; 376/249; 376/256
[58] Field of Search ........................ 376/245, 305, 376/249, 256; 73/592, 850, 150 R

[56] References Cited

U.S. PATENT DOCUMENTS

| | | | |
|---|---|---|---|
| 4,179,349 | 12/1979 | Park | 204/195 R |
| 4,966,746 | 10/1990 | Richardson et al. | 376/249 |
| 5,009,105 | 4/1991 | Richardson et al. | 73/621 |
| 5,135,709 | 8/1992 | Andersen et al. | 376/305 |
| 5,217,596 | 6/1993 | Indig et al. | 204/435 |
| 5,323,429 | 6/1994 | Roarty et al. | 376/249 |

*Primary Examiner*—Donald P. Walsh
*Assistant Examiner*—Meena Chelliah
*Attorney, Agent, or Firm*—James E. McGinness

[57] ABSTRACT

A method and an apparatus for measuring the degree of intergranular stress corrosion cracking protection in the area of the core shroud weldments. Electrochemical potential sensors are attached to the shroud wall and the upper core spray line at locations near the actual weld surface of concern to ensure the accuracy of the electrochemical potential measurements. A working electrode doped or coated with noble metal and a reference electrode are implanted into the reactor core shroud. A throughhole is drilled or machined into the shroud wall at an elevation just below the top guide support ring, i.e., near the core shroud weldments. Then a plug containing the working and reference electrodes is inserted into the throughhole.

20 Claims, 4 Drawing Sheets

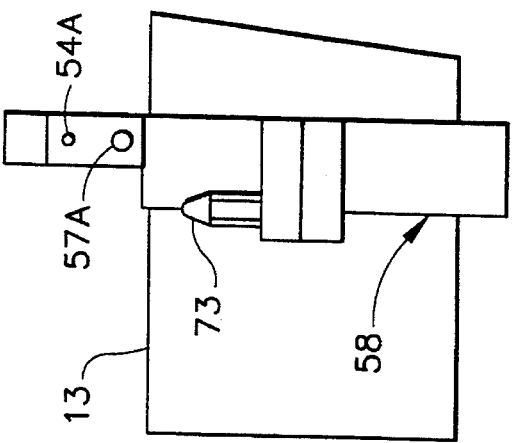
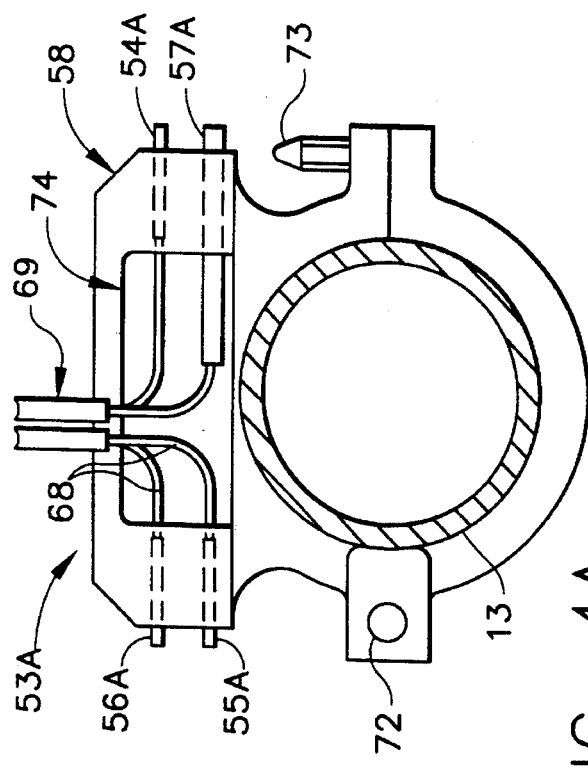
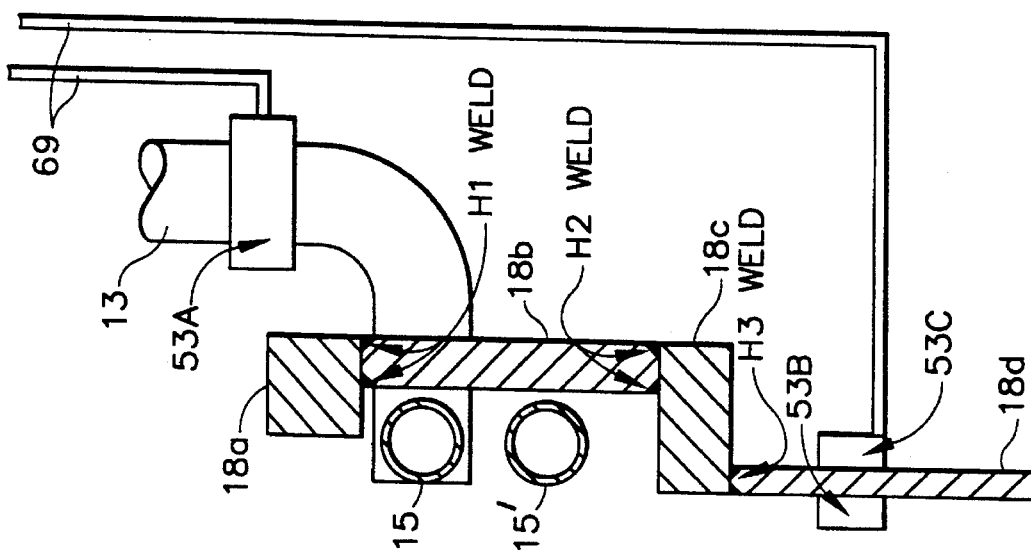
FIG. 4B
FIG. 4A
FIG. 3

SHROUD ELECTROCHEMICAL POTENTIAL MONITOR

FIELD OF THE INVENTION

This invention relates to reducing the corrosion potential of components exposed to high-temperature water, i.e., water having a temperature of about 150° C. or greater or steam. In particular, the invention relates to the reduction of corrosion potential in a light water nuclear reactor by the injection into the water of hydrogen.

BACKGROUND OF THE INVENTION

Stress corrosion cracking (SCC) is a known phenomenon occurring in reactor components, such as structural members, piping, fasteners, and welds, exposed to high-temperature water. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, heat treatment, and radiation can increase the susceptibility of metal in a component to SCC.

It is well known that SCC occurs at higher rates when oxygen is present in the reactor water in concentrations of about 5 ppb or greater. SCC is further increased in a high radiation flux where oxidizing species, such as oxygen, hydrogen peroxide, and short-lived radicals, are produced from radiolytic decomposition of the reactor water. Such oxidizing species increase the electrochemical corrosion potential (ECP) of metals. Electrochemical corrosion is caused by a flow of electrons from anodic to cathodic areas on metallic surfaces. The ECP is a measure of the thermodynamic tendency for corrosion phenomena to occur, and is a fundamental parameter in determining rates of, e.g., SCC, corrosion fatigue, corrosion film thickening, and general corrosion.

In a BWR, the radiolysis of the primary water coolant in the reactor core causes the net decomposition of a small fraction of the water to the chemical products $H_2$, $H_2O_2$, $O_2$ and oxidizing and reducing radicals. For steady-state operating conditions, equilibrium concentrations of $O_2$, $H_2O_2$, and $H_2$ are established in both the water which is recirculated and the steam going to the turbine. This concentration of $O_2$, $H_2O_2$, and $H_2$ is oxidizing and results in conditions that can promote intergranular stress corrosion cracking (IGSCC) of susceptible materials of construction. One method employed to mitigate IGSCC of susceptible material is the application of hydrogen water chemistry (HWC), whereby the oxidizing nature of the BWR environment is modified to a more reducing condition. This effect is achieved by adding hydrogen gas to the reactor feedwater. When the hydrogen reaches the reactor vessel, it reacts with the radiolytically formed oxidizing species to reform water, thereby lowering the concentration of dissolved oxidizing species in the water in the vicinity of metal surfaces. The rate of these recombination reactions is dependent on local radiation fields, water flow rates and other variables.

The injected hydrogen reduces the level of oxidizing species in the water, such as dissolved oxygen, and as a result lowers the ECP of metals in the water. However, factors such as variations in water flow rates and the time or intensity of exposure to neutron or gamma radiation result in the production of oxidizing species at different levels in different reactors. Thus, varying amounts of hydrogen have been required to reduce the level of oxidizing species sufficiently to maintain the ECP below a critical potential required for protection from IGSCC in high-temperature water. As used herein, the term "critical potential" means a corrosion potential at or below a range of values of about −230 to −300 mV based on the standard hydrogen electrode (SHE) scale. IGSCC proceeds at an accelerated rate in systems in which the ECP is above the critical potential, and at a substantially lower or zero rate in systems in which the ECP is below the critical potential. Water containing oxidizing species such as oxygen increases the ECP of metals exposed to the water above the critical potential, whereas water with little or no oxidizing species present results in an ECP below the critical potential.

Corrosion potentials of stainless steels in contact with reactor water containing oxidizing species can be reduced below the critical potential by injection of hydrogen into the water so that the dissolved concentration is about 50 to 100 ppb or greater. For adequate feedwater hydrogen addition rates, conditions necessary to inhibit IGSCC can be established in certain locations of the reactor. Different locations in the reactor system require different levels of hydrogen addition. Much higher hydrogen injection levels are necessary to reduce the ECP within the high radiation flux of the reactor core.

It has been shown that IGSCC of Type 304 stainless steel used in BWRs can be mitigated by reducing the ECP of the stainless steel to values below −0.230 V(SHE). An effective method of achieving this objective is to use HWC. However, high hydrogen additions to the feed-water, e.g., of about 0.4 ppm or greater, that may be required to reduce the ECP below the critical potential, can result in a higher radiation level in the steam-driven turbine section from incorporation of the short-lived N-16 species in the steam. For most BWRs, the amount of hydrogen addition required to provide mitigation of IGSCC of pressure vessel internal components results in an increase in the main steam line radiation monitor by a factor of five to eight. This increase can cause high, even unacceptable, environmental dose rates that can require expensive investments in shielding and radiation exposure control. Thus, recent investigations have focused on using minimum levels of hydrogen to achieve the benefits of HWC with minimum increase in the main steam radiation dose rates. The application of stainless steel or nickel alloy coatings containing platinum or palladium additions has recently been qualified as a mitigation technique for IGSCC-susceptible BWR shroud welds. With these coatings, a much smaller hydrogen addition will provide IGSCC protection with a resultant smaller acceptable steam line radiation increase.

A conventional boiling water reactor is shown in FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. A core spray inlet 11 supplies water to a core spray sparger 15 via core spray line 13. The feedwater from feedwater sparger 14 flows downwardly through the downcomer annulus 16, which is an annular region between RPV 10 and core shroud 18. Core shroud 18 is a stainless steel cylinder which surrounds the core 20, which is made up of a plurality of fuel bundle assemblies 22 (only two 2×2 arrays of which are shown in FIG. 1). Each array of fuel bundle assemblies is supported at the top by a top guide 19 and at the bottom by a core plate 21. The core top guide provides lateral support for the top of the fuel assemblies and maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Core upper plenum 26 provides standoff between the steam-water mixture exiting core 20 and entering vertical standpipes 30, which are disposed atop shroud head 28 and in fluid communication with core upper plenum 26.

The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is withdrawn from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence. A typical BWR has 16 to 24 inlet mixers. The jet pump assemblies are circumferentially distributed around the core shroud 18.

The core shroud 18 (see FIG. 3) comprises a shroud head flange 18a for supporting the shroud head; a circular cylindrical upper shroud wall 18b having a top end welded to shroud head flange 18a; an annular top guide support ring 18c welded to the bottom end of upper shroud wall 18b; a circular cylindrical lower shroud wall 18d having a top end welded to top guide support ring 18c; and an annular core plate support ring (not shown) welded to the bottom end of lower shroud wall 18d. The diameter of upper shroud wall 18b is greater than the diameter of lower shroud wall 18d. The entire structure is supported by RPV shroud support 51 (see FIG. 1), which is welded to shroud 18, and by annular shroud support plate 52, which is welded at its inner diameter to the RPV shroud support 51 and at its outer diameter to RPV 10.

Cracking in the core shroud poses a problem. Such cracking appears to be intergranular stress corrosion cracking (IGSCC) and is associated with the various weldments of the shroud. In particular, stress corrosion cracking has been found in the top guide support ring of BWRs. These cracks in top guide support ring 18c (see FIG. 3) extend radially inwardly from the outer circumferential surface thereof and radially outwardly from the inner circumferential surface thereof in the vicinity of the welds which join top guide support ring 18c to shroud walls 18b and 18d. Stress corrosion cracking in top guide support ring 18c diminishes the structural integrity of shroud 18, which vertically and horizontally supports core top guide 19 and shroud head 28. The cracking can progress to the stage where mechanical repair is required to allow a plant to return to power. Such repair takes several months to plan and implement, resulting in significant unplanned outage time.

An accepted means of mitigating IGSCC in the core shroud and other components of the BWR primary system is implementation of HWC. The primary method used to quantify the levels of hydrogen injection needed to achieve IGSCC protection is the measurement of the ECP of BWR water in the specific region of interest. It is known to measure reactor water ECP in the core region using ECP sensors installed in modified local power range monitors, and in the RPV bottom head drain line and recirculation piping using special flange assemblies. Because of the potential detrimental impact of shroud cracking on BWR operation, a need exists to measure the ECP in the vicinity of the core shroud weldments to determine the level of hydrogen injection required for protection against IGSCC.

SUMMARY OF THE INVENTION

The present invention is a method and an apparatus for measuring the degree of IGSCC protection in the area of the core shroud weldments. ECP sensors are attached to the shroud wall and the upper core spray line at locations near the actual weld surface of concern to ensure the accuracy of the ECP measurements.

In accordance with a first preferred embodiment of the invention, a working electrode doped or coated with noble metal and a pair of reference electrodes are implanted into the reactor core shroud. A throughhole is drilled or machined into the shroud wall at an elevation just below the top guide support ring, i.e., near the H2 and H3 core shroud weldments. Then a plug containing the working and reference electrodes is inserted into the throughhole.

The working electrode should have a composition which mimicks the composition of the shroud, i.e., stainless steel coated or doped with a noble metal, such as platinum or palladium. For HWC (i.e., molar ratio of H:O>2), a reference electrode made of noble metal (e.g., platinum or palladium) can be used. For either normal water chemistry (i.e., H:O=2) or HWC, a reference electrode made of iron oxide can be used. In accordance with a preferred embodiment of the invention, the electrode array includes a working electrode, a noble metal reference electrode and an iron oxide reference electrode, as well as any number of additional redundant electrodes to maintain an operative monitoring system even in the event of electrode failure.

In accordance with a further aspect of the invention, a second electrode array is mounted on the outside of the shroud wall just below the top guide support ring. The second electrode array preferably includes the same types of electrodes as those utilized in the first electrode array. In accordance with a preferred embodiment, the first and second electrode arrays can be mounted on the same mounting adapter.

In accordance with yet another aspect of the invention, a third electrode array is mounted on the core spray inlet elbow at an elevation just above the H1 weldment at the shroud flange. Again the makeup of the third electrode array is preferably the same as for the first and second arrays.

Insulated instrument cables are used to take the signals from the electrodes to an ECP meter located outside the reactor pressure vessel and containment. The ECP meter outputs are then processed by a data acquisition system.

BRIEF DESCRIPTION OF THE DRAWINGS

FIG. 3 is a sectional view of a portion of the core shroud of the BWR shown in FIG. 2, showing the locations of three electrode arrays utilized in a preferred embodiment of the invention.

FIGS. 4A and 4B are top and side views, respectively, of an electrode array assembly mounted on the core spray inlet elbow.

DETAILED DESCRIPTION OF THE PREFERRED EMBODIMENTS

The present invention is a method and an apparatus for monitoring the ECP in the vicinity of the core shroud weldments. As shown in FIG. 3, respective sets of electrodes (also referred to herein as "sensors") are installed at three locations. Sensor array 53A is attached to the inlet elbow 13 in the vicinity of the H1 weld in the shroud flange. Elbow 13 is connected to upper core spray sparger 15, which is located above lower core spray sparger 15' inside the shroud 18. Sensor array 53B is inserted through and projecting inside the shroud wall at an elevation below and near the H2 and H3 welds in the top guide support ring. Sensor array 53C is attached to the outside of the shroud wall at an elevation below and near the H2 and H3 welds.

Figure 5B:
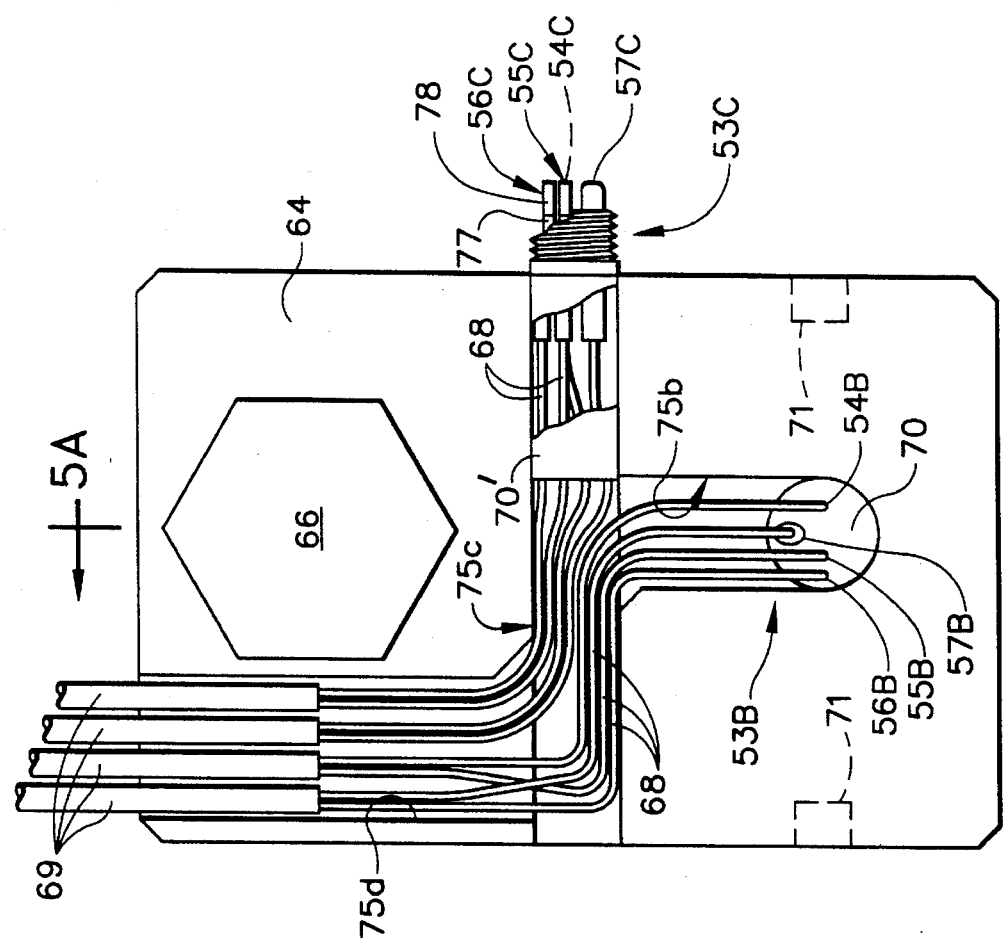
FIGS. 5A and 5B are sectional and azimuthal views, respectively, of an electrode array assembly mounted on the shroud wall.

Referring to FIGS. 4A and 5B, each sensor array comprises a noble metal coated or doped working electrode (56A, 56B, 56C), a noble metal working electrode (55A, 55B, 55C), an iron oxide or silver chloride reference electrode (57A, 57B, 57C) and at least one redundant working electrode (54A, 54B) for use in the event of working electrode failure. (The redundant electrode for sensor array 53C is behind electrode 55C and therefore not visible in FIG. 5B).

Each ECP sensor is attached to a separate 1/8-inch-diameter mineral insulated (MI) signal cable 68 to form a sensor string. To protect the MI signal cable from mechanical damage during installation and from the environment during operation, 0.390-inch-diameter stainless steel protective tubing 69 is used to encase ECP sensor signal cables 68, each tube encasing two cables. Signals from the ECP sensors are routed out of the reactor pressure vessel, through the drywell and to a data acquisition system (DAS) in the reactor building (not shown) via cables 68.

The sensor arrays 53A and 53C provide ECP data for the coolant environment for the exterior of the shroud in the RPV annulus region. The sensor array 53B provides ECP data for the coolant environment for the interior of the shroud in the fuel core region.

A mounting adapter in the form of a clamp 58 (see FIGS. 4A and 4B) is used to house and attach the ECP sensors of array 53A on the upper core spray line elbow 13. Clamp 58 comprises two halves pivotably coupled by a pivot pin 72 at one end and held together by a screw 73 at the other end. The mounting clamp 58 is installed remotely by tightening screw 73 with a wrench mounted on the end of a conventional service pole.

One half of clamp 58 is provided with an extension plate to which a pair of stainless steel tubes 69 are welded. The extension plate has four through-holes for receiving the four electrodes (55A, 56A, 57A, 58A) of array 53A, each electrode being held in place by a set screw (not shown) with the ends of the electrodes protruding from the holes. The extension plate of clamp 58 is further provided with a recess 74 in which the ECP sensor signal cables are routed from the respective electrodes into the tubes 69, two cables per tube.

Figure 5A:
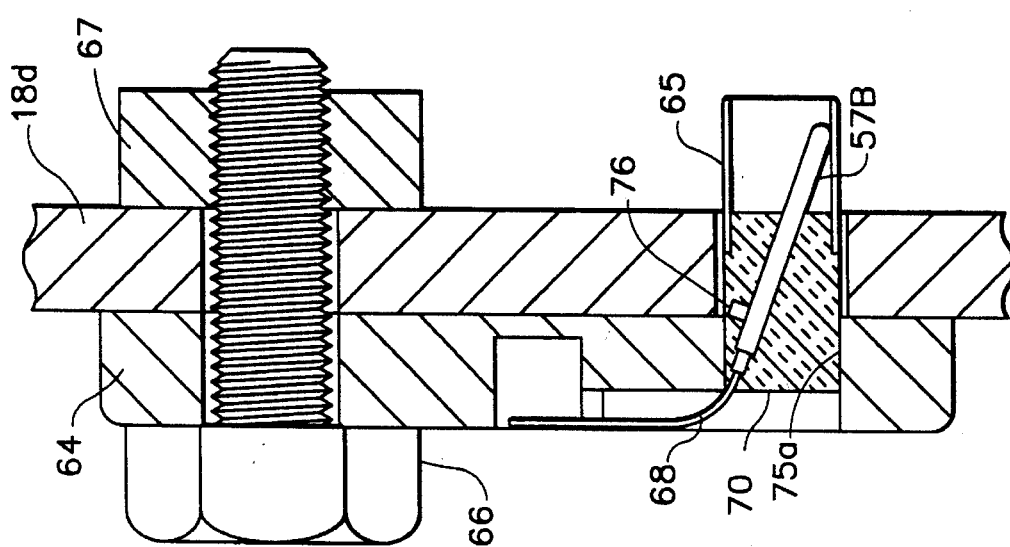

Preferably, sensor arrays 53B and 53C are mounted on shroud wall 18d using a single mounting adaptor, e.g., mounting plate 64 (see FIGS. 5A and 5B). Installation of mounting plate 64 requires cutting two 2-inch-diameter holes in the shroud by electric discharge machining (EDM). The holes are machined with their center axes mutually parallel and lying in an azimuthal plane. One hole is used to secure the mounting plate to the shroud 18 with a 2-inch bolt 66 and a nut 67, and the other hole is used to pass sensor array 53B through the shroud 18 into the interior thereof.

Referring to FIG. 5A, electrodes 54B, 55B, 56B and 57B of array 53B are embedded in a plug 70, being held in place by, for example, a set screw 76. One end of plug 70 is threaded for receiving the threaded end of a metal cover 65 which protects the delicate tips of the electrodes during installation. Similarly, electrodes 54C, 55C, 56C and 57C of array 53C are embedded in a plug 70' the threaded end of which is coupled with a protective cover during installation. FIG. 5B shows array 53C after removal of the protective cover from plug 70'.

Each working electrode (see, e.g., 56C in FIG. 5B) comprises a metal tip 78, an electrical insulator 77 having a central bore and a conducting wire which passes through the central bore of the insulator for connecting the metal tip to the conducting wire of the MI cable 68. The electrical insulating portion of each electrode may be made of sapphire or ceramic and is brazed to the end of the metal tip 78. For the sake of convenience, the metal tip and the electrically insulating midportion have not been shown for all working electrodes. In contrast, the iron oxide reference electrode comprises a monolithic ceramic tip on metal.

To attach mounting plate 64 to shroud 18, bolt 66 is inserted into an upper hole in mounting plate 64 and then secured to the plate by tack welding. Then mounting plate 64 is installed remotely on the outer surface of the shroud wall using an installation tool that couples with dimples 71 on the sides of plate 64. First, the mounting plate is lowered into position in the downcomer annulus with the shaft of bolt 66 and cover 65 aligned with the EDM holes. Then plate 64 is displaced radially inward. The shaft of bolt 66 enters the upper EDM hole in the shroud wall, while the protective cover 65 enters the lower hole during insertion. To secure mounting plate 64 to shroud 18, the nut 67 is attached, torqued and tack welded remotely.

The mounting plate is provided with a bore 75A for receiving plug 70; a lower vertical channel 75B for receiving four cables 68 from electrode array 53B; a horizontal channel 75C for receiving plug 70' and eight cables 68 from electrode arrays 53B and 53C; and an upper vertical channel 75D for receiving four tubes 69 and eights cables 68 from electrode arrays 53B and 53C, with tubes 69 being welded therein.

The signal cable protective tubing 69 from each electrode array is bundled and supported together by conventional support brackets (not shown). All support brackets for the protective tubes are welded remotely at the designated locations. The protective tubing is installed remotely into the support brackets and secured in place with a bolted latch and by tack welding the bolt head to the latch and the latch to the bracket body.

Figure 1:
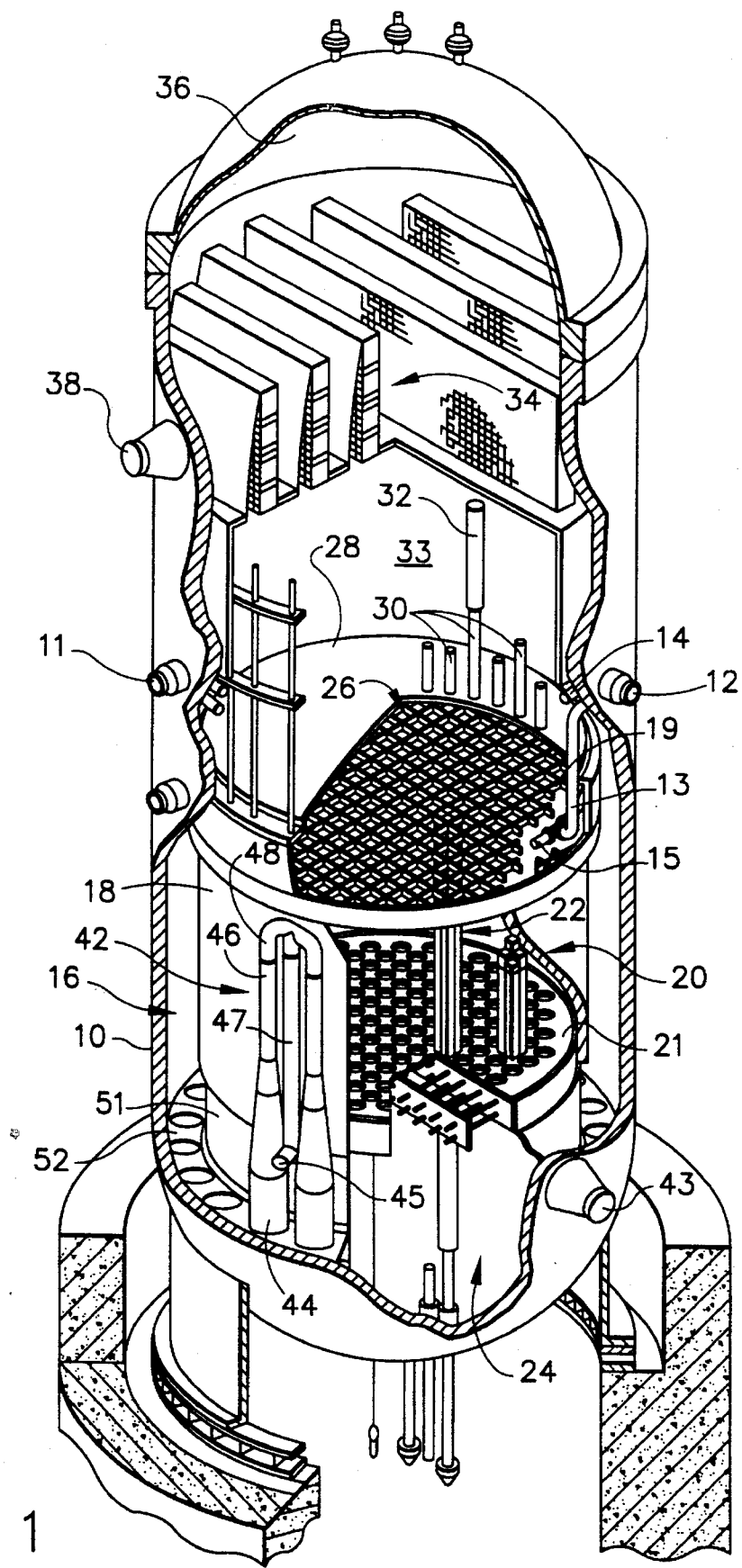
FIG. 1 is a schematic showing a partially cutaway perspective view of a conventional BWR.
Figure 2:
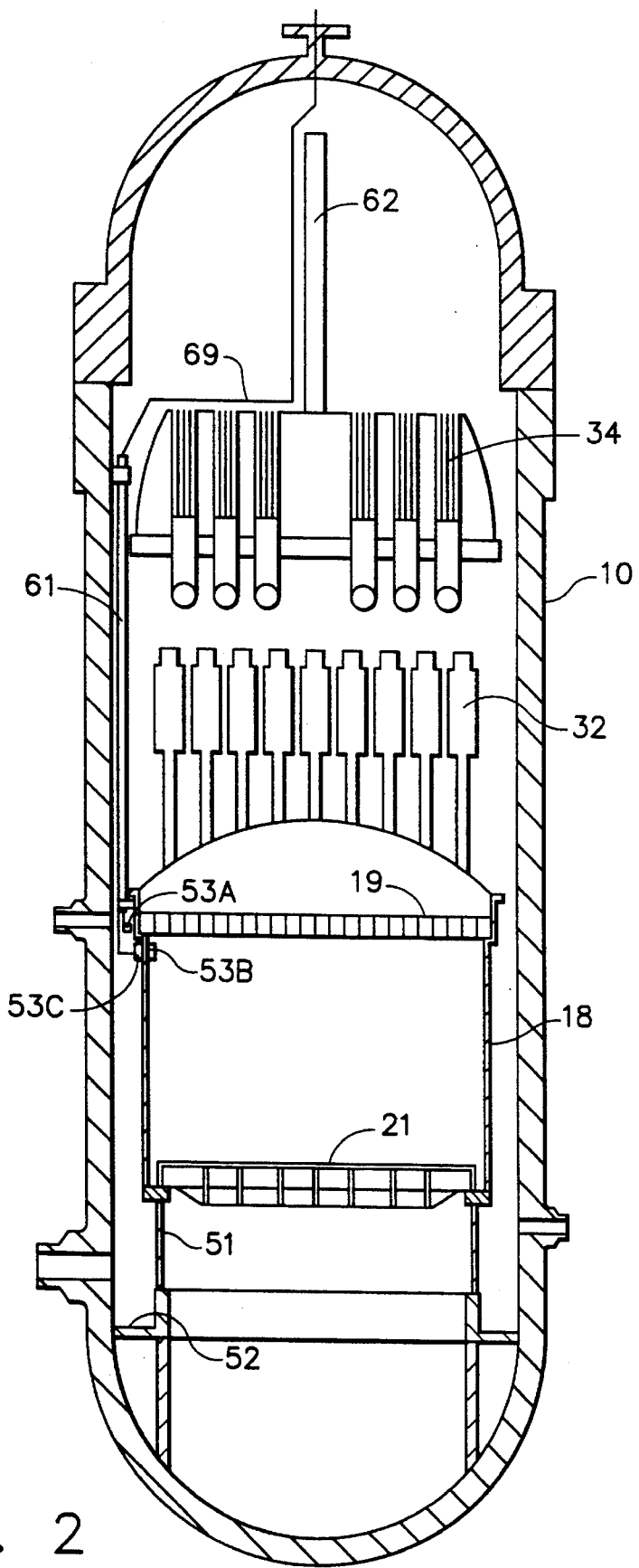
FIG. 2 is a sectional view of a BWR equipped with a shroud ECP monitoring system in accordance with the present invention.

After installation at their respective locations, the twelve ECP signal cables 68, encased in a bundle of six stainless steel tubes 69, are routed from the interior to the exterior of the RPV (see FIG. 2). Before the steam separator and steam dryer are installed in the RPV, the bundle of tubes 69 (see FIG. 2) is routed along one of the two guide rods 61 that are mounted on the shroud. The tube bundle is attached to brackets that are welded to the guide rod at approximately 12- to 18-inch intervals.

After the signal tube bundle is routed upward along the guide rod, the steam separator and dryer assemblies are installed in the RPV. The signal tube bundle is then routed over the top of the steam dryer 34 to its center and is supported by brackets welded to the top of the dryer. A support mast 62, mounted vertically on top of the dryer, supports the signal cable tube bundle 69 as it is routed to the inner surface of the RPV top head. The tube bundle is attached to the support mast 62 by means of brackets welded thereto.

The sensor string exits the reactor vessel through one of the instrument nozzles and is secured to the instrument nozzle flange with a penetration bolt. The penetration bolt, which is attached to the end of the signal tube bundle, is fed through the vessel head instrument nozzle as the vessel head is installed. Once the vessel head has been installed, the penetration bolt is secured to the instrument flange by a penetration bolt/flange/nut assembly. The nozzle flange is then attached to the instrument nozzle to complete the installation. This arrangement allows passage of the signal cables from the RPV while maintaining the pressure boundary. This arrangement also forms a continuous protective assembly for the ECP sensors and signal cables.

Each ECP sensor signal cable 68 is terminated with individual connectors (not shown) which connect into a multi-pin connector to consolidate the twelve ECP signal cables into a single wiring bundle. This bundle is routed through an available drywell penetration to the ECP meter located outside the vessel and containment.

The ECP sensor strings are installed during a refueling/maintenance outage. After completion of shroud ECP testing during plant restart and subsequent plant operation, these ECP sensor strings are removed from the reactor vessel.

A hydrogen ramping addition test program is performed at the host plant to determine the exact level of hydrogen gas injection required for protection against IGSCC at the three shroud weld locations. The ECP is measured at the three shroud weldments for each level of feedwater hydrogen injection. The injection rate at which IGSCC protection was achieved (usually considered to be ECP=−0.230 V(SHE)) can be ascertained and controlled.

The preferred embodiments of the shroud ECP monitor have been disclosed for the purpose of illustration. Variations and modifications of the disclosed structure which do not depart from the concept of this invention will be readily apparent to engineers skilled in the art of monitoring nuclear reactors. All such variations and modifications are intended to be encompassed by the claims set forth hereinafter.

We claim:

1. A method for monitoring electrochemical potential near a weldment in a shroud surrounding a fuel core inside a pressure vessel of a light water nuclear reactor, comprising the steps of:

forming a first throughhole in a wall of said shroud in the vicinity of said weldment;

supporting a first electrochemical potential sensor on a supporting means; and coupling said supporting means to said first throughhole, thereby mounting said first electrochemical potential sensor on said shroud wall.

2. The method as defined in claim 1, further comprising the step of forming said supporting means with a first portion for supporting said first electrochemical potential sensor such that said first portion and said first electrochemical potential sensor reside outside said shroud when said supporting means is coupled to said first throughhole.

3. The method as defined in claim 2, further comprising the steps of:

forming a second throughhole in said shroud wall in the vicinity of said first throughhole; and forming said supporting means with a second portion for supporting a second electrochemical potential sensor such that said second portion extends into said second throughhole with said second electrochemical potential sensor protruding into said shroud.

4. The method as defined in claim 1, further comprising the steps of:

forming a second throughhole in said shroud wall in the vicinity of said first throughhole; and forming said supporting means with a portion for supporting said first electrochemical potential sensor such that said portion extends into said second throughhole with said first electrochemical potential sensor protruding into said shroud.

5. The method as defined in claim 1, further comprising the step of electrically insulating said first electrochemical potential sensor from said shroud wall.

6. The method as defined in claim 1, wherein said first electrochemical potential sensor and said shroud wall are made of stainless steel doped or coated with noble metal.

7. The method as defined in claim 1, further comprising the step of measuring the electrochemical potential of said first electrochemical potential sensor relative to a reference for various levels of feedwater hydrogen injection.

8. The method as defined in claim 1, further comprising the steps of:

surrounding a tip of said first electrochemical potential sensor with a protective cover before said first electrochemical potential sensor is inserted in said second throughhole; and removing said protective cover after said first electrochemical potential sensor is inserted in said second throughhole.

9. A shroud electrochemical potential monitor for monitoring electrochemical potential near a weldment in a shroud surrounding a fuel core inside a pressure vessel of a light water nuclear reactor, comprising:

a first electrochemical potential sensor;

means for supporting said first electrochemical potential sensor; and means for coupling said supporting means to a wall of said shroud.

10. The shroud electrochemical potential monitor as defined in claim 9, wherein said supporting means comprises a a plug in which said first electrochemical potential sensor is embedded and a mounting plate having a channel for holding said plug and a first throughhole for receiving an electrical cable from said first electrochemical potential sensor, and said coupling means comprises a nut and bolt assembly which is coupled to a second throughhole formed in said mounting plate.

11. The shroud electrochemical potential monitor as defined in claim 9, wherein said supporting means comprises a first portion for supporting said first electrochemical potential sensor such that said first portion and said first electrochemical potential sensor reside outside said shroud when said coupling means is coupled to said shroud wall.

12. The shroud electrochemical potential monitor as defined in claim 11, further comprising a second electrochemical potential sensor, said supporting means comprising a second portion for supporting said second electrochemical potential sensor such that said second portion extends into a throughhole formed in said shroud wall and said second electrochemical potential sensor protrudes inside said shroud when said coupling means is coupled to said shroud wall.

13. The shroud electrochemical potential monitor as defined in claim 9, wherein said supporting means comprises a portion for supporting said first electrochemical potential sensor such that said portion extends into a throughhole and said first electrochemical potential sensor protrudes inside said shroud when said coupling means is coupled to said shroud wall.

14. The shroud electrochemical potential monitor as defined in claim 13, wherein said first electrochemical potential sensor comprises a portion made of electrically insulating material.

15. The shroud electrochemical potential monitor as defined in claim 13, further comprising a second electrochemical potential sensor supported by said portion for supporting said first electrochemical potential sensor, said first and second electrochemical potential sensors having different electrochemical potentials under the same conditions.

16. The shroud electrochemical potential monitor as defined in claim 9, wherein said first electrochemical potential sensor and said shroud wall are made of stainless steel doped or coated with noble metal.

17. The shroud electrochemical potential monitor as defined in claim 16, further comprising a second electrochemical potential sensor supported by said means for supporting said first electrochemical potential sensor, wherein said second electrochemical potential sensor is made of noble metal or iron oxide.

18. The shroud electrochemical potential monitor as defined in claim 16, further comprising a protective cover threadably coupled to said means for supporting said first electrochemical potential sensor, said cover protecting a tip of said first electrochemical potential sensor during installation.

19. A shroud electrochemical potential monitor for monitoring electrochemical potential near a weldment in a shroud surrounding a fuel core inside a pressure vessel of a light water nuclear reactor, comprising:

an electrochemical potential sensor;

mounting means for supporting said electrochemical potential sensor;

a clamp having first and second halves pivotably coupled by a pivot pin for pivoting between an open position and a closed position, said first half of said clamp being connected to said mounting means; and fastening means for securing said clamp in said closed position, said first and second halves having contact surfaces which lie along a circle in said closed position.

20. A method for monitoring electrochemical potential near a weldment in a shroud surrounding a fuel core inside a pressure vessel of a light water nuclear reactor, comprising the steps of:

mounting an electrochemical potential sensor on a clamp that has an open state and a closed state;

fastening said clamp in its closed state onto a core spray inlet line in the vicinity of said weldment.

\* \* \* \* \*